United States Patent [19]
Johnson

[11] Patent Number: 5,727,670
[45] Date of Patent: Mar. 17, 1998

[54] SERVICING ARRANGEMENT FOR A CONVEYOR BELT CLEANER

[75] Inventor: Ronald Johnson, Elko, Nev.

[73] Assignee: Martin Engineering Company, Neponset, Ill.

[21] Appl. No.: 547,066

[22] Filed: Oct. 23, 1995

[51] Int. Cl.⁶ .................................................. B65G 45/16
[52] U.S. Cl. ........................................ 198/497; 198/499
[58] Field of Search ................................. 198/497, 499

[56] References Cited

U.S. PATENT DOCUMENTS

| | | |
|---|---|---|
| 3,674,131 | 7/1972 | Matson . |
| 4,053,045 | 10/1977 | Reiter . |
| 4,098,394 | 7/1978 | Stahura ................... 198/499 |
| 4,105,109 | 8/1978 | Schultz . |
| 4,249,650 | 2/1981 | Stabura . |
| 4,365,706 | 12/1982 | Bright . |
| 4,529,084 | 7/1985 | Zhang . |
| 4,533,035 | 8/1985 | Reiter ..................... 198/499 |
| 4,533,036 | 8/1985 | Gordon . |
| 4,533,037 | 8/1985 | Kerr ....................... 198/499 |
| 4,535,883 | 8/1985 | Kerr ....................... 198/499 |
| 4,643,293 | 2/1987 | Swinderman . |
| 4,825,996 | 5/1989 | Davidts .................. 198/497 |
| 4,925,434 | 5/1990 | Swinderman et al. ... 198/499 X |
| 4,953,689 | 9/1990 | Peterson et al. . |
| 4,995,851 | 2/1991 | Taylor ................... 198/499 X |
| 5,007,523 | 4/1991 | Morefield . |
| 5,011,002 | 4/1991 | Gibbs . |
| 5,385,507 | 1/1995 | Swearingen et al. . |

FOREIGN PATENT DOCUMENTS

| | | | |
|---|---|---|---|
| 2800868 | 7/1978 | Germany ............... 198/497 |
| 9110609 | 7/1991 | WIPO .................... 198/497 |

OTHER PUBLICATIONS

Martin Engineering Company "Durt Hawg Conveyor Belt Cleaner" brochure, 1992.

The SCA Primary Belt Scraper pamphlet, by Scorpio Scrapers (UK) Ltd., four pages, date of publication unknown.

The New Scorpio V–Plough Belt Scraper, by Scorpio Scrapers, four pages, date of publication unknown.

SC16 Secondary Belt Scraper pamphlet, by Scorpio Scrapers, one page, date of publication unknown.

*Primary Examiner*—D. Glenn Dayoan
*Attorney, Agent, or Firm*—Lee, Mann, Smith, McWilliams, Sweeney & Ohlson

[57] ABSTRACT

A servicing arrangement is provided for a conveyor belt cleaner. The servicing arrangement includes an elongate mandrel member having a first end and second end. The second end of the mandrel member is adapted to be attached to a support such that the mandrel member is retained by the support in a cantilevered manner. A support member is adapted to be positioned over the mandrel member by sliding the support member over the first end of the mandrel member. The support member is selectively slidable along the mandrel member to selectively remove or selectively mount the support member on the mandrel member. The support member is adapted to receive and support a conveyor belt cleaner. An operator can easily remove the conveyor belt cleaner from the mandrel member for service or replacement of the conveyor belt cleaner from the outside of a conveyor housing during conveyor operation when a suitably designed tensioner with a release mechanism is used to protect the operator from cleaner blade pull through.

18 Claims, 2 Drawing Sheets

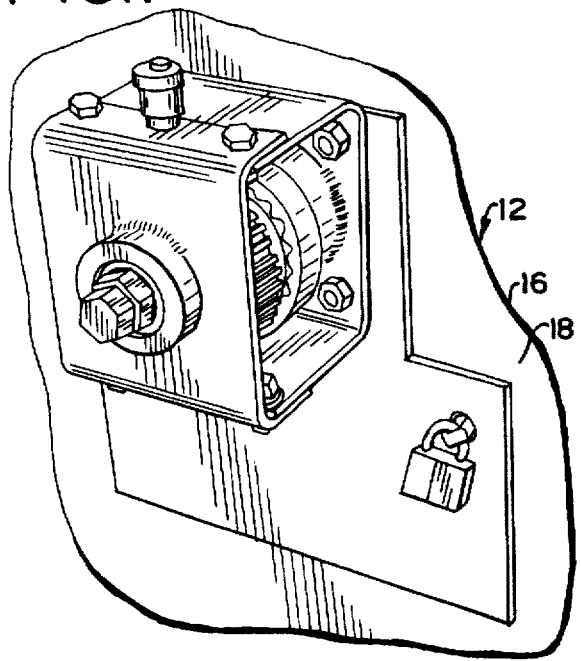
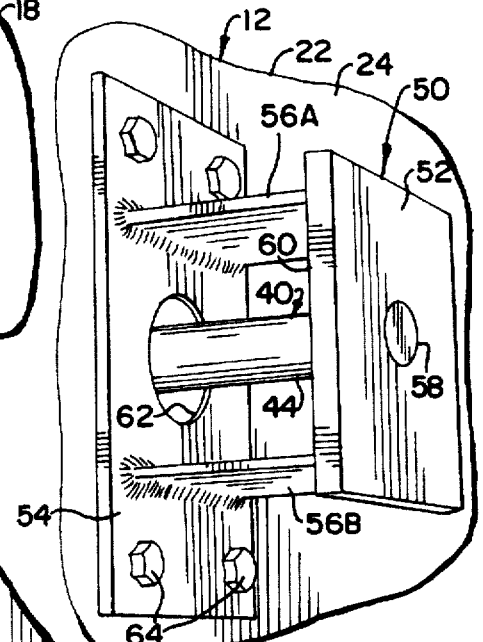
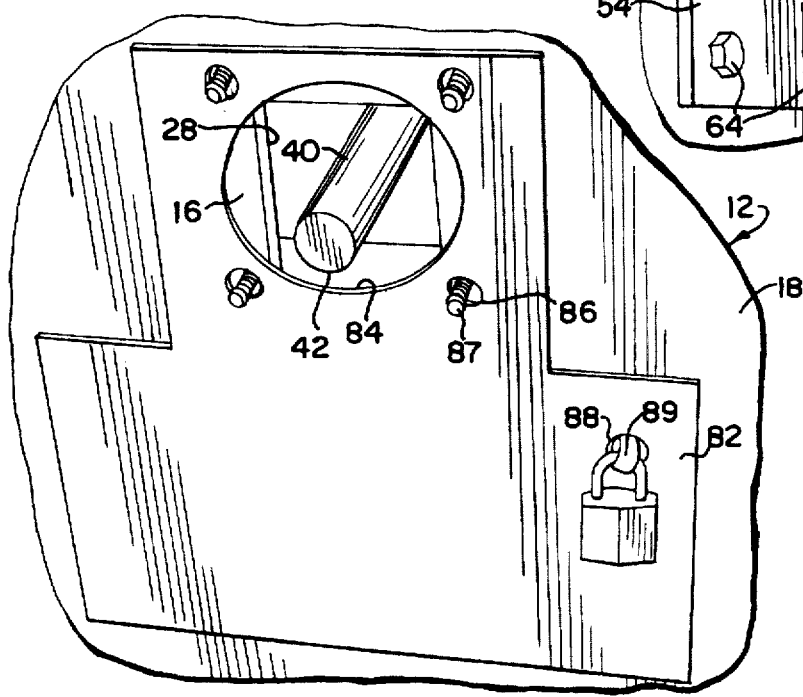

SERVICING ARRANGEMENT FOR A CONVEYOR BELT CLEANER

BACKGROUND OF THE INVENTION

The present invention is directed to a servicing arrangement for a conveyor belt cleaner, and in particular to a servicing arrangement which enables a conveyor belt cleaner to be selectively removed or installed from a location exterior to the housing in which the conveyor belt cleaner is located.

Conveyor belt cleaners are often used at the discharge end of a conveyor to remove any conveyed material which adheres to the conveyor belt. The scraping blades of a belt cleaner wear down during use and require periodical replacement in order to maintain belt cleaning efficiency. Conveyor belt cleaners are typically mounted to opposing walls of a housing which forms part of a conveyor chute. When maintenance on a conveyor belt cleaner is required, such as the replacement of scraper blades, the conveyor is typically shutdown thereby stopping rotation of the belt to allow maintenance personnel to enter the chute housing for access to the belt cleaner. Although the conveyor is shutdown, maintenance personnel are still exposed to the potential danger of falling downwardly through the conveyor chute.

There has been a need expressed to be able to perform maintenance on conveyor belt cleaners, including the replacement of scraper blades, while the conveyor belt is in operation. This need is particularly felt by plants that operate continuous processes wherein the shutdown of a conveyor stops operation of the process. As belt cleaning efficiency is becoming more and more a necessity for the efficient operation of a process, and as the use of highly abrasive bulk solids in processes is requiring more frequent maintenance to conveyor belt cleaners to maintain cleaning efficiency, shutting down conveyors to perform conveyor belt maintenance is becoming problematic. While there is a need to be able to perform maintenance on conveyor belt cleaners while the conveyor remains in operation, performing maintenance service on a conveyor belt cleaner from within a chute housing while the conveyor remains in operation is dangerous as the maintenance personnel are exposed to the rotating belt, moving idler rollers and other components of the conveyor, the material discharged from the conveyor, and the downward opening of the conveyor chute. In addition, while the conveyor is operating, conveyor belt cleaners are subject to the potential for "pull through" of the scraper blades by the conveyor belt.

A belt cleaner mounting arrangement having slidably removable scraper blades is described in U.S. Pat. No. 4,249,650, which is assigned to the applicant Martin Engineering Company. The mounting arrangement includes an elongate support member which is rotatably mounted at each end in respective bearing assemblies. A plurality of sleeve members connected one to the other are slidably carried on the support member, but are prevented from rotating with respect to the support member. A scraper blade is mounted to each sleeve member. A flexible cable extends through the hollow center of the support member and is attached to the outwardly located sleeve members. The sleeve members and scraper blades are removed from the support member by disassembling one of the bearing members and pulling on the cable to slide the sleeve members off of the support member. The support member of the conveyor belt cleaner remains located within the conveyor housing during removal of the sleeve members and scraper blades.

A conveyor belt cleaner also having slidably removable scraper blades is described in U.S. Pat. No. 4,953,689, which is also assigned to Martin Engineering Company. The belt cleaner includes an elongate support member which is adapted to be rotatably mounted in bearing members at each respective end thereof. A plastic sleeve is mounted over the support member. The sleeve is slidable longitudinally with respect to the support member, but is connected to the support member to prevent sliding movement during use. The sleeve is also prevented from rotating with respect to the support member. The sleeve includes an elongate track in which scraper blades are slidably mounted. A cable extending through the scraper blades is pulled to slide the scraper blades along the track and off of the sleeve. The sleeve and the support member remain located within the conveyor housing during removal of the scraper blades.

Neither of the arrangements disclosed in these two patents provide a guide member which guides and supports the support member and scraper blades of a conveyor belt cleaner after the support member is disengaged from its bearing members to allow the removal thereof from the conveyor housing, and which guides and supports the support member and scraper blades as the support member is installed within the conveyor housing until the support member is rotatably mounted at each end in its bearing members.

The present invention provides a servicing arrangement for a conveyor belt cleaner which allows the conveyor belt cleaner scraper blades and support member to be removed and replaced by maintenance personnel from the exterior of the conveyor housing while the conveyor remains in operation thereby reducing or eliminating the potential for injury to maintenance personnel during conveyor belt cleaner maintenance.

SUMMARY OF THE INVENTION

A servicing arrangement is provided for supporting and guiding a conveyor belt cleaner having one or more scraper blades mounted to a support member as the conveyor belt cleaner is removed from, or mounted to, a support structure. The servicing arrangement includes an elongate mandrel guide member having a first end and a second end. The second end of the mandrel member is adapted to be attached to a support such as a side wall of a conveyor chute housing. The first end of the mandrel member is preferably located adjacent an aperture located in an opposing side wall of the conveyor chute housing. A support member having a bore extending therethrough is adapted to be rotatably positioned over the mandrel member to cover the mandrel member and prevent the deposit of conveyed material thereon. The support member is selectively slidable along the axis of the mandrel member and relatively rotatable with respect thereto such that the support member is selectively removable or selectively positionable on the mandrel member through the aperture in the side wall of the housing. The support member is adapted to receive and support a conveyor belt cleaner blade such that when the support member is positioned over the mandrel member in operative position and the cleaner blades are mounted on the support member, rotation of the support member relative to the mandrel member is effective to position the cleaner blade or blades relative to the conveyor belt.

BRIEF DESCRIPTION OF THE DRAWINGS

FIG. 1 is a perspective view of a tensioning device shown attached to the servicing arrangement of the present invention and to the exterior surface of a side wall of a conveyor chute housing.

FIG. 2 is a perspective view of the second end of the servicing arrangement shown attached to the exterior surface of a second side wall of the conveyor chute housing.

FIG. 3 is a perspective view similar to FIG. 1 but with the tensioning device removed to show the first end of the mandrel member.

DETAILED DESCRIPTION OF THE PREFERRED EMBODIMENT

Figure 4:
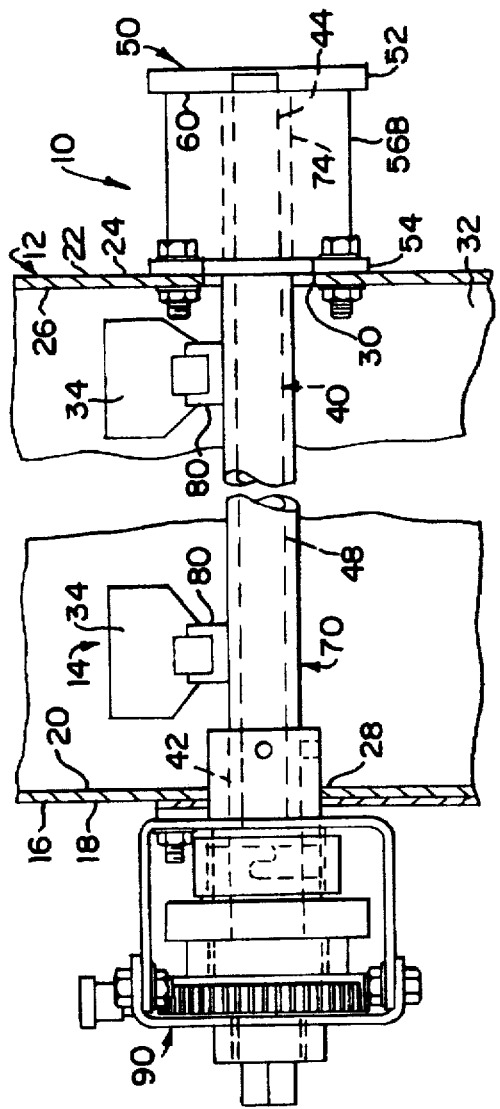
FIG. 4 is an elevational view of the servicing arrangement shown installed in a conveyor chute housing and with a tensioning device and a conveyor belt cleaner attached thereto.
Figure 5:
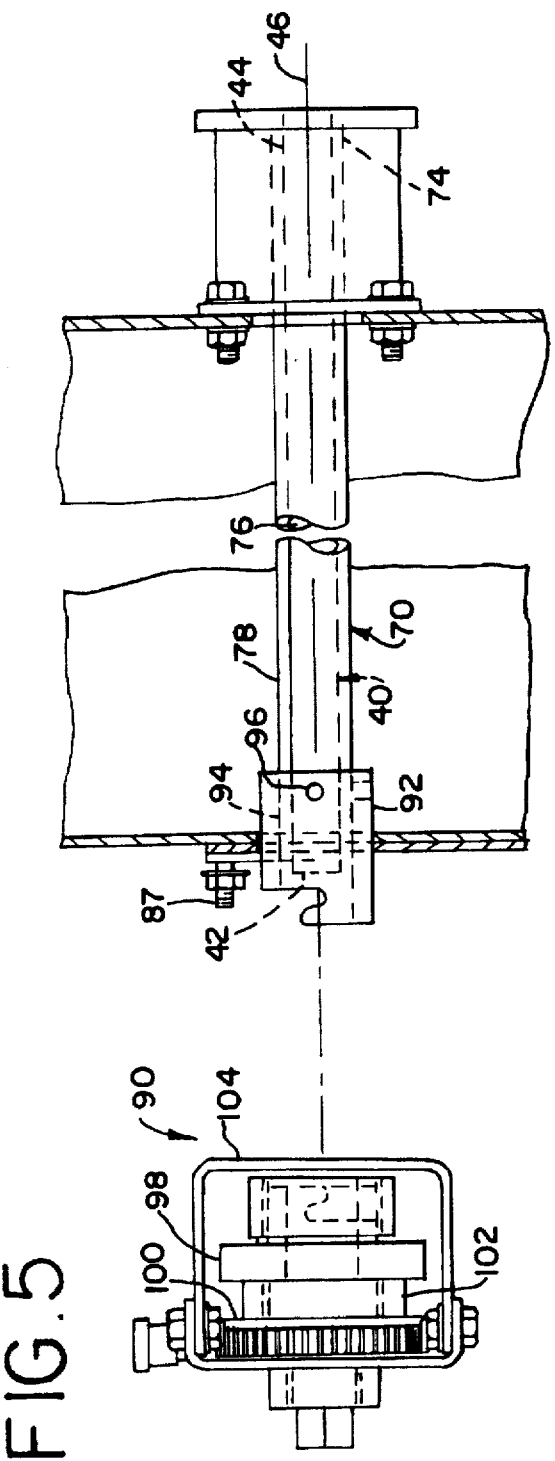
FIG. 5 is an exploded view showing the servicing arrangement installed in a conveyor chute housing and the tensioning device.

As best shown in FIG. 4, the servicing arrangement 10 of the present invention is adapted to be attached at one end to a fixed support such as a conveyor chute housing 12 and is adapted to support and guide a conveyor belt cleaner 14 for use in cleaning the belt (not shown) of a conveyor. The chute housing 12 includes a first side wall 16 having an external surface 18 and an internal surface 20 and an opposing second side wall 22 having an external surface 24 and an internal surface 26. The second side wall 22 is spaced apart from the first side wall 16 and is generally parallel thereto. As best shown in FIG. 3, the first side wall 16 includes an aperture 28. The aperture 28 is shown in FIG. 3 as being generally L-shaped, but may be configured in various other shapes as desired including circular, rectangular, or an inverted T-shape. The second side wall 22 includes an aperture 30 as best shown in FIG. 4 which is generally circular, but which may be formed in various other configurations and shapes as desired. The chute housing 12 defines a chamber 32 located between the first side wall 16 and the second side wall 22. The conveyor belt cleaner 14 includes one or more scraper blades 34 adapted for scraping engagement with a conveyor belt. The conveyor belt cleaner 14 may be of the type as described in U.S. Pat. Nos. 4,598,823, 4,643,293, or 4,953,689 which are assigned to Martin Engineering Company, the applicant herein, or various other types of conveyor belt cleaners as desired.

The servicing arrangement 10 includes an elongate mandrel member 40 having a first end 42, a second end 44 and a longitudinal axis 46. The mandrel member 40 includes an outer surface 48 which is generally circular or cylindrical, but which may be formed in other shapes as desired. The mandrel member 40 may be a solid shape such as a rod or bar, or a hollow shape such as a tube.

The servicing arrangement 10 also includes a mounting member 50 as best shown in FIG. 2. The mounting member 50 includes a first plate element 52 and a second plate element 54 spaced apart from and generally parallel to the first plate element 52. The first plate element 52 is attached to the second plate element 54 by ribs 56A–B which are spaced apart from one another and which extend generally perpendicular to the first plate element 52. The second end 44 of the mandrel member 40 is attached to and retained by the first plate element 52. The first plate element 52 may include an aperture 58 adapted to receive the second end 44 of the mandrel member 40 whereupon the second end 44 is welded to the first plate element 52. Alternatively, the second end 44 may abut and be welded to the interior surface 60 of the first plate element 52 or the second end 44 may be threadably attached to the first plate element 52. The second end 44 of the mandrel member 40 is thereby rigidly attached to the first plate element 52 such that the mandrel member 40 extends in a cantilevered manner from the first plate element 52. However, the second end 44 may be attached to the first plate element 52 in various other manners such that the second end 44 is rotatably attached to the first plate element 52 for selective rotation about the axis 46, is pivotally attached to the first plate element 52, or is slidably attached to the first plate element 52 such that the mandrel member 40 may slide generally linearly and vertically upwardly or downwardly.

The second plate element 54 includes a generally circular aperture 62 through which the mandrel member 40 extends. The aperture 62 has a diameter which is larger than the diameter of the mandrel member 40. The mandrel member 40 extends substantially concentrically through the aperture 62. The second plate element 54 also includes a plurality of apertures adapted to receive fasteners 64 for attaching the second plate element 54 of the mounting member 50 to the external surface 24 of the second side wall 22 of the chute housing 12. Alternatively, the second plate element 54 and ribs 56A–B may be eliminated and the first plate element 52 may be attached directly to the second side wall 22. When the second end 44 of the mandrel member 40 is attached to the second side wall 22 of the chute housing 12, the first end 42 of the mandrel member 40 preferably extends a short distance through the aperture 28 in the first side wall 16 such that access to the first end 42 is provided to an operator or maintenance personnel without entering the chamber 32 of the chute housing 12.

The servicing arrangement 10 also includes a tubular support member 70 having a first end 72 and a second end 74. The support member 70 includes a bore 76 extending between the first end 72 and second end 74. The support member 70 includes an outer surface 78 which is generally circular or cylindrical, but which may be rectangular or other shapes as desired. As best shown in FIG. 4, one or more mounting plates 80 may be attached to the outer surface 78 of the support member 70 which are adapted to removably retain the scraper blades 34. Alternatively, a sleeve member (not shown) such as described in U.S. Pat. No. 4,953,689 may be slidably mounted over the support member 70 to removably retain the scraper blades 34. The bore 76 of the support member 70 is larger in diameter than the outside diameter of the mandrel member 40. Depending upon the particular arrangement, the fit could vary between a precision fit with a few thousandths of an inch clearance to a relatively loose fit. The support member 70 is adapted to be rotatably positioned over the mandrel member 40 for selective rotation about the axis 46 with respect to the mandrel member 40 and is adapted to be slidable along the mandrel member 40 generally parallel to the axis 46. The outer diameter of the support member 70 is adapted to fit closely within the aperture 62 of the mounting member 50. The second end 74 of the support member 70 extends through the aperture 62 of the mounting member 50 and is thereby rotatably mounted to and supported by the mounting member 50. Alternatively, the second end 74 of the support member 70 may fit closely within the aperture 30 of the housing 12 such that the second end 74 is rotatably mounted and supported by the second sidewall 22 of the housing 12 or a bearing member attached thereto.

As best shown in FIG. 3, the servicing arrangement 10 also includes a cover plate 82. The cover plate 82 includes a generally circular aperture 84 and a plurality of apertures 86 which are adapted to receive fasteners 87. The cover plate 82 also includes an aperture 88 adapted to receive a hasp 89 which is attached to the external surface 18 of the first side wall 16. The cover plate 82 is adapted to be fastened to the exterior surface 18 of the first side wall 16 by the fasteners 87 with the first end 42 of the mandrel member 40 extending generally concentrically through the aperture 84. The cover plate 82 is adapted to cover the aperture 28 in the first side wall 16 except for the area left open by the aperture 84. If desired the cover plate 82 may be additionally secured to the first side wall 16 by a padlock attached to the hasp 89 to prevent unauthorized removal of the cover plate 82.

A tensioning device 90 may be used in connection with the servicing arrangement 10 to provide selective rotation of the support member 70 and conveyor belt cleaner 14 about the axis 46. A preferred tensioning device is disclosed in U.S. Pat. No. 5,385,507, which is assigned to the applicant Martin Engineering Company and which is incorporated herein by reference. Other types of tensioning devices may also be used with the servicing arrangement 10, however, the tensioning device must protect the operator from scraper blades being pulled through by the moving belt if service work is done while the belt is in operation. The tensioning device 90 includes an adapter member 92 having a bore 94 which is adapted to receive the first end 72 of the support member 70. The adapter 92 is selectively connected to the first end 72 of the support member 70 by fastener means such as a set screw 96. The adapter member 92 is selectively attached to a driven hub 98. The driven hub 98 is attached to a drive hub 100 by a resilient torsion coupling member such as a torsion tube 102. The drive hub 100 is selectively rotatably attached to a housing 104. As best shown in FIGS. 1 and 4, the housing 104 of the tensioning device 90 is mounted to a fixed support such as the first side wall 16 of the chute housing 12 by the fasteners 87. The first end 72 of the support member 70 is thereby rotatably mounted to a fixed support by the tensioning device 90.

In operation, the mounting member 50 is attached to the exterior surface 24 of the second side wall 22 of the chute housing 12 such that the mandrel member 40 extends through the aperture 30 in the first side wall 12 and such that the first end 42 of the mandrel member 40 extends a short distance through the aperture 28 in the opposing first side wall 16. The support member 70, having the scraper blades 34 of the conveyor belt cleaner 14 attached thereto and having the adapter member 92 of the tensioning device 90 attached to the first end 72, is slidably placed onto the mandrel member 40. The second end 74 of the support member 70 is slid over the first end 42 of the mandrel member 40 such that the first end 42 is inserted into the bore 76 at the second end 74 of the support member 70. The support member 70 is slid longitudinally along the mandrel member 40 generally parallel to the axis 46 such that the support member 70 and the conveyor belt cleaner 14 pass through the aperture 28 in the first side wall 16. The support member 70 is slid along and guided by the mandrel member 40 until the second end 74 of the support member 70 passes through the aperture 30 in the second side wall 22, through the aperture 62 in the second plate element 54 and abuts the interior surface 60 of the first plate element 52. The support member 70 is adapted to fit closely within the aperture 62 of the second plate element 54 to substantially seal the aperture 62 thereby preventing dust within the chamber 32 from escaping through the aperture 62. When the support member 70 is fully inserted over the mandrel member 40, the first end 72 of the support member 70 is located at the first side wall 16 such that the adapter member 92 of the tensioning device 90 is located at least in part outside of the chamber 32 of the chute housing 12. The cover plate 82 is placed adjacent the external surface 18 of the first side wall 16 with the fasteners 87 extending through the apertures 86. The driven hub 98 of the tensioning device 90 is coupled to the adapter member 92 and the housing 104 is attached to the first side wall 16 by the fasteners 87. The conveyor belt cleaner 14 may then be rotated about the axis 46 and about the mandrel member 40 into scraping engagement with the conveyor belt by the tensioning device 90 with the desired amount of force. The installation or mounting of the support member 70 and conveyor belt cleaner 14 within the chamber 32 of the chute housing 12 is accomplished by maintenance personnel operating entirely outside of the chute housing 12 and without entering the chamber 32 while the conveyor belt remains in operation. Once the support member 70 and belt cleaner 14 are installed, the mandrel member 40 is not necessary to the operation or support of the belt cleaner 14 as the support member 70 is mounted by the tensioning device 90 and mounting member 50 to the housing 12. The servicing arrangement 10 is installed and may be removed when desired from the exterior of the housing 12.

The support member 70 and the conveyor belt cleaner 14 may similarly be removed from the mandrel member 40 and the chamber 32 in a reverse manner by maintenance personnel operating entirely outside of the chute housing 12 while the conveyor belt remains in operation as the maintenance personnel do not enter the chamber 32. The tensioning force applied by the tensioning device 90 to the scraper blades 34 is initially released. The tensioning device 90 is then removed from the first side wall 16 and uncoupled from the adapter member 92. The support member 70 and belt cleaner 14 are rotated, by manually grasping the adapter member 92 and first end 72 of the support member 70, to rotate the scraper blades 34 away from the conveyor belt to avoid any contact therewith. The cover plate 82 is then removed. The support member 70 and the attached conveyor belt cleaner 14 may then be slid along the mandrel member 40 through the aperture 28 in the first sidewall 16 and off the first end 42 of the mandrel member 40 to remove the support member 70 and conveyor belt cleaner 14 from the mandrel member 40 and the chamber 32, all from the outside of the chute housing 12.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A servicing arrangement for a conveyor belt cleaner including:

a belt cleaner support member adapted to receive and support one or more conveyor belt cleaner blades;

an elongate mandrel member having a first end and a second end, said mandrel member adapted to be supported adjacent to the belt to be cleaned and to guide and position said belt cleaner support member during installation and removal of said belt cleaner support member, said belt cleaner support member adapted to slide over said mandrel member during installation and removal, said belt cleaner support member being relatively rotatable with respect to said mandrel member;

whereby when said belt cleaner support member is positioned over said mandrel member in operative position, and the cleaner blades are mounted on the belt cleaner support member, rotational movement of the belt cleaner support member positions the cleaner blades relative to the conveyor belt, and whereby an operator can easily remove said belt cleaner support member and attached conveyor belt cleaner blades from said mandrel member for service or replacement of the conveyor belt cleaner blades.

2. The servicing arrangement of claim 1 including means for mounting said support member to thereby secure said support member in position relative to the conveyor belt.

3. The servicing arrangement of claim 1 including a mounting member having a first element adapted to be stationarily attached to a support and a second element spaced apart from and attached to said first element, said second element including an aperture, said second end of said mandrel member being attached to said first element such that said mandrel member extends through said aperture in said second element.

4. The servicing arrangement of claim 3 wherein said mandrel member extends substantially concentrically through said aperture in said second element.

5. The servicing arrangement of claim 3 wherein said aperture in said second element is larger than said mandrel member such that said mandrel member does not directly engage said second element.

6. The servicing arrangement of claim 3 wherein said support member is adapted to extend through said aperture in said second element of said mounting member.

7. The servicing arrangement of claim 1 wherein said mandrel member is substantially solid.

8. The servicing arrangement of claim 1 including means for selectively attaching said support member to a support.

9. The servicing arrangement of claim 8 wherein said means for selectively attaching comprises a tensioning device, said tensioning device adapted to be attached to said support member to selectively rotate said support member.

10. The servicing arrangement of claim 1 including means on said support member for mounting one or more conveyor belt cleaner blades.

11. A servicing arrangement for a conveyor belt cleaner including:
- a mounting member adapted to be attached to a first support;
- an elongate mandrel member having a first end and a second end, said second end of said mandrel member being attached to said mounting member such that said mandrel member extends in a cantilevered manner from said mounting member; and
- a support member having a bore, said support member being selectively positionable on said mandrel member and relatively rotatable with respect thereto by sliding said support member over said first end of said mandrel member and being selectively removable from said mandrel member by sliding said support member off of said first end of said mandrel member, said support member adapted to receive and support one or more conveyor belt cleaner blades;
- whereby when said mounting member is attached to the first support, said first end of said mandrel member is supported by said mounting member such that the conveyor belt cleaner may be selectively slid on or off said first end of said mandrel member.

12. The servicing arrangement of claim 11 wherein said mounting member includes a first element adapted to be attached to the first support and a second element attached to said first element, said second element including an aperture, said second end of said mandrel member being attached to said first element such that said mandrel member extends through said aperture in said second element.

13. The servicing arrangement of claim 12 wherein said mandrel member extends substantially concentrically through said aperture.

14. The servicing arrangement of claim 12 wherein said aperture in said second element is larger than said mandrel member such that said mandrel member does not directly engage said second element.

15. The servicing arrangement of claim 11 including means for selectively attaching said support member to a second support.

16. The servicing arrangement of claim 15 wherein said means for selectively attaching comprises a tensioning device, said tensioning device adapted to be attached to said support member to selectively rotate said support member about said mandrel member to position said cleaner blades relative to said conveyor belt.

17. The servicing arrangement of claim 11 including means on said support member for mounting one or more conveyor belt cleaner blades.

18. A servicing arrangement for a conveyor belt cleaner positioned in a conveyor housing including a first sidewall having an aperture and a second sidewall, said servicing arrangement including:
- an elongate mandrel member having a first end and a second end, said second end of said mandrel member adapted to be attached to the second side wall of the conveyor housing such that said first end of said mandrel member is located adjacent the first side wall of the conveyor housing; and
- a support member movable with respect to said mandrel member, said support member being selectively slidable along said mandrel member to selectively remove or to selectively mount said support member, said support member being relatively rotatable with respect to said mandrel member, said support member adapted to receive and support the conveyor belt cleaner;
- whereby an operator can remove said support member and the conveyor belt cleaner for service or replacement of the conveyor belt cleaner from outside of the conveyor housing by sliding the support member along said mandrel member and through the aperture in the first side wall of the conveyor housing and whereby an operator can mount said support member and the conveyor belt cleaner for operation from outside of the conveyor housing by sliding said support member onto said first end of said mandrel member and through the aperture in the first side wall of the conveyor housing.

* * * * *

UNITED STATES PATENT AND TRADEMARK OFFICE
CERTIFICATE OF CORRECTION

PATENT NO. : 5,727,670
DATED : March 17, 1998
INVENTOR(S) : Ronald Johnson

It is certified that error appears in the above-identified patent and that said Letters Patent is hereby corrected as shown below:

In claim 5, at line 2, delete "dement" and insert --element-- therefor.

Signed and Sealed this

Second Day of June, 1998

Attest:

BRUCE LEHMAN

Attesting Officer

Commissioner of Patents and Trademarks